United States Patent [19]
Vladimirov et al.

[11] 4,219,877
[45] Aug. 26, 1980

[54] SPECIAL-PURPOSE DIGITAL COMPUTER FOR STATISTICAL DATA PROCESSING

[76] Inventors: Evgeny E. Vladimirov, ulitsa Yaroslava Gasheka, 2, kv. 1; Vladimir G. Korchagin, prospekt Veteranov, 144/21, kv. 202; Jury B. Sadomov, ulitsa Tipanova, 2, kv. 17; Lev M. Khokhlov, ulitsa Gertsena, 47, kv.10, all of Leningrad, U.S.S.R.

[21] Appl. No.: 869,518

[22] Filed: Jan. 16, 1978

[51] Int. Cl.$^2$ .................. G06F 7/00; G06F 15/06; G06F 15/36
[52] U.S. Cl. .................. 364/554; 364/900
[58] Field of Search .............. 364/554, 550, 551, 556, 364/569, 900, 200

[56] References Cited
U.S. PATENT DOCUMENTS
4,145,744 3/1979 Sidorovich et al. ............ 364/551 X

*Primary Examiner*—Edward J. Wise
*Attorney, Agent, or Firm*—Lackenbach, Lilling & Siegel

[57] ABSTRACT

A special-purpose digital computer for statistical data processing comprises a random-number generator, four stochastic data rounding units, of which the first two stochastic data rounding units are connected to input data lines, a shift register unit, and three receiving registers. The first and the third receiving registers have their inputs interconnected and coupled to the output of the shift register unit. The input of the shift register is connected to the second receiving register and to its own output. A single-time step multiplier is connected to the two last stochastic data rounding units. Senior and a junior address digit registers are interconnected and coupled to a decoder. A logical memory is connected to the decoder, to the single/time step multiplier, to the output lines, to the first two stochastic data rounding units, to the first receiving register, and to the junior address digit register. A read-only memory is connected to the logical memory; and, a quantization step counter is connected to the stochastic data rounding units. A clock is connected to the read-only memory, to the random-number generator, to the stochastic data rounding units, to the senior and junior address digit registers, to the decoder, to the receiving registers, to the logical memory, and to the shift register unit. A distributor is connected to the stochastic data rounding units, to the clock, to the senior and junior address digit registers, to the first and the second receiving registers, to the quantization step counter, and to the logical memory.

4 Claims, 4 Drawing Figures

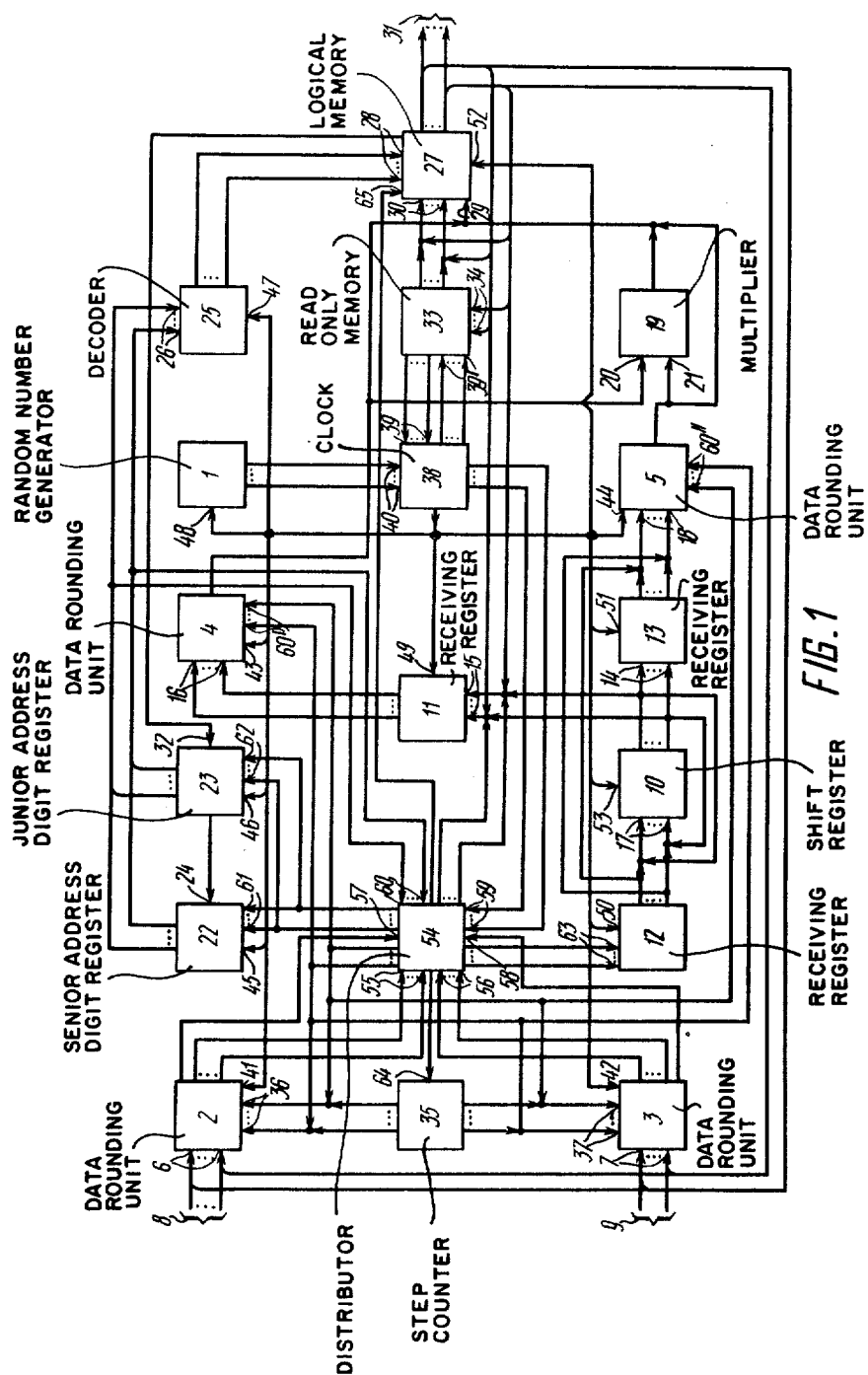

SPECIAL-PURPOSE DIGITAL COMPUTER FOR STATISTICAL DATA PROCESSING

FIELD OF THE INVENTION

The present invention relates generally to data processing devices and, more particularly, to a special-purpose digital computer for statistical data processing.

Many natural and man-induced phenomena, which are requisite for solving a number of research and technological problems in such fields of science and technology as hydrometeorology, geophysics, medicine, electronics, and nuclear physics, are of random nature. For this reason, statistical processing of information becomes at present a number-one task, because accumulation of large amounts of input data for statistical processing is unprofitable economically, and in some cases a delay in processing may even make the information worthless for application.

Therefore, the designers and manufacturers of computing equipment are facing an urgent task of creating a high-performance, inexpensive and compact special-purpose digital computer for statistical data processing, i.e. for computing statistical characteristics of random processes, that would have a wide range of functional capabilities. This task has to some extent been solved in the present invention.

Most practical problems in studying and using multiparameter phenomena involve random processes characterized by random changes of physical quantities with time.

Random processes are described by random functions $X(t)$ or $Y(t)$ and contain a plurality of realizations of these functions, namely, $$x_1(t), x_2(t), \ldots, x_i(t), \ldots, x_k(t), \text{ or}$$

$$y_1(t), y_2(t), \ldots, y_i(t), \ldots, y_k(t),$$

which are an array of random numbers from 1 to k.

DESCRIPTION OF THE PRIOR ART

At present, statistical characteristics are computed on statistical analyzers that use digital methods of calculation and are able to make real-time computation, or on digital computers which are specially adapted for calculating statistical characteristics of random processes.

Usually, statistical analyzers, as for example, the TE-9300, TE-9400 models of the "Tekelec Airtronic" company in France, the 700I model produced by "Uniscope", SAI-51A–54A analyzers manufactured by "SAICOR" and the 372IA and 3729A models of the "Hewlett Packard" company in the USA, are high-complexity devices with high hardward redundancy, which increases the costs of manufacture of such analyzers and makes it impossible to use them for "coarse-fine" measurements. Moreover, these machines have limited functional capabilities which narrows their use for a number of applications. In addition, digital computers are expensive and do not permit real-time computation. Solution of statistical processing tasks on the IBM-360 digital computer, in particular, correlation and spectral analysis, requires as long as several hours.

According to USSR Author's Certificate No. 402,873, filed July 27, 1971, (Bulletin of Inventions No. 42, 1973), a digital field random signal analyzer is known. This analyzer comprises an analog-to-digital converter; a stochastic data rounding unit having an input connected to an output of the analog-to-digital converter; a dynamic storage unit having one input connected to an output of the stochastic data rounding unit and one output connected to an input of a stochastic binary element; a uniform random-number generator; an AND circuit unit; a digital-to-analog converter; a comparator having one input of which is connected to an output of the uniform random-number generator and to another output of the stochastic data rounding unit, a second input connected to a respective output of the dynamic storage unit, and an output connected to an input of the AND circuit unit; a control unit having an output connected to another input of the stochastic data rounding unit and to a respective input of the dynamic storage unit; and an integrator unit having one input connected to an output of the control unit, an output connected to an input of the digital-to-analog converter, a second input connected to a respective input of the AND circuit unit, to a respective output of the AND circuit unit, and to a respective output of the stochastic binary element; and a third input of the stochastic binary element being connected to a respective output of the uniform random-number generator.

Also known in the prior art is a special-purpose digital computer for statistical data processing (USSR Author's Certificate No. 432,509 filed Dec. 29, 1972, Bulletin No. 22, 1974).

This special-purpose computer cmprises a random-number generator for producing a uniform pseudo-random number sequence, and stochastic data rounding units intended for linear conversion of a code into its probability and stochastic rounding of numbers, multi-channel outputs of the first two stochastic data rounding units being connected to respective input data lines. The known computer also comprises a shift register unit and receiving registers; multi-channel inputs of the first two receiving registers are connected electrically to multi-channel outputs of respective stochastic data rounding units. A multi-channel input of the third receiving register is interconnected with a multi-channel input of the first receiving register and coupled to a multi-channel output of the shift register unit which is also connected to is multi-channel input. A multi-channel output of the second register is connected to the input of the shift register unit receiving registers, and to a multi-channel input of the fourth stochastic data rounding unit. The computer also comprises a data accumulator and a single-time step multiplier for sto- chastic multiplication of numbers. The multiplier has one input connected to an output of the third stochastic data rounding unit, another input connected to the fourth stochastic data rounding unit, and an output connected to inputs of the first and second stochastic data rounding units and to an input of the data accumulator. A multi-channel output of the accumulator is connected to multi-channel inputs of the first and the second stochastic data rounding units, and to other output lines. This known digital computer also comprises a microprogram control unit with a multi-channel output thereof connected to inputs of the random-number generator, receiving registers, shift register unit and the data accumulator. A harmonic and "correlation window" function generator has its output connected to one of the inputs of the first receiving register.

The above known devices fail to compute the conditional entropy of random processes, which narrows their functional capabilities and the application range and makes the devices unsuitable for solving a number of tasks.

SUMMARY OF THE INVENTION

It is an object of the invention to provide a special-purpose digital computer for statistical data processing which could be used for computing the conditional entropy of random processes.

Another object of the invention is to provide a special-purpose digital computer for statistical data processing with minimum costs of the hardware.

The foregoing and other objects of this invention are attained in a special-purpose digital computer for statistical data processing, which comprises a random-number generator for producing a uniform pseudo-random number sequence. Four stochastic data rounding units are intended for linear conversion of a code into its probability and for stochastic rounding of numbers and are connected electrically to the random-number generator, multi-channel inputs of the first two stochastic data rounding units being connected to respective input data lines. A shift register unit and three receiving registers are provided multi-channel inputs of the first two receiving registers are connected electrically to multi-channel outputs of respective stochastic data rounding units via a distributor unit, and a multi-channel input of the third receiving register is interconnected with a multi-channel input of the first receiving register. The output of the first receiving register is coupled to the third stochastic data rounding unit. A multi-channel output of the shift register unit is connected to its own multi-channel input, and to multi-channel inputs of the first and third receiving registers. A multi-channel input of the fourth stochastic data rounding unit is connected to a multi-channel output of the third receiving register. A single-time step multiplier for stochastic multiplication of numbers has inputs connected, respectively, to outputs of the last two stochastic data rounding units. According to the invention, a senior address digit register and a junior address digit register are also provided. An output of the junior address digit register is connected to an input of the senior address digit register. A decoder has multi-channel input connected to multi-channel outputs of the senior and junior address digit registers. A logical memory is intended for accumulating and storing data, adding numbers and summing up unity increments of numbers, the inputs of which being connected to a multi-channel output of the decoder, to an output of the single-time step multiplier and to its own multi-channel output. The multi-channel output of the logical memory is also connected to output lines, to multi-channel inputs of the first two stochastic data rounding units and to a multi-channel input of the first receiving register. An output is connected to an input of the junior address digit register. A read-only memory is intended for storing harmonic functions, "correlation window" functions, logarithmic functions, correction factors and for storing microinstructions, a multi-channel output thereof being connected to a multi-channel input of the logical memory, and a multi-channel input being connected to a multi-channel output of the logical memory. A quantization step counter is used to determine data intervals in quantization, multi-channel outputs of which being connected to multi-channel inputs of the stochastic data rounding units. A clock has its multi-channel input and multi-channel output connected to a multi-channel output and a multi-channel input of the read-only memory, another multi-channel input being connected to a multi-channel output of the random-number generator. An output of the clock is connected to inputs of the stochastic data rounding units, to inputs of the senior and junior address digit registers, to an input of the decoder, to an input of the random-number generator, to inputs of the receiving registers, to an input of the logical memory, and to an input of the shift register unit. A distributor is intended for distributing data depending on the operating modes of the special-purpose digital computer, multi-channel inputs and inputs of which being connected, respectively, to the multi-channel outputs and the outputs of the first two stochastic data rounding units, to a multi-channel output of the clock, and to a multi-channel output of the senior and junior address digit registers. Multi-channel outputs and outputs of the distributor are connected to multi-channel inputs of the stochastic data rounding units, to multi-channel inputs of the senior and junior address digit registers, to a multi-channel input of the first receiving register, to a multi-channel input of the second receiving register, to an input of the quantization step counter, and to an input of the logical memory.

It is preferable that the logical memory comprises a data accumulator and an address amplifier unit, whose multi-channel input is connected to the multi-channel output of the decoder its and whose multi-channel output is connected to a multi-channel input of the data accumulator. A digit amplifier unit has a multi-channel output connected to a multi-channel input of the data accumulator. An output unit has its multi-channel inputs connected to a multi-channel output of the data accumulator and to an output of the clock, its multi-channel outputs being connected to output lines and a multi-channel input of the read-only memory. A clock circuit has a multi-channel input connected to an output of the clock and an output connected to an input of the junior address digit register. A digit distributor is intended for receiving and intermediate storage of data and for summing up unity increments. A logical unit is intended for adding numbers and has a multi-channel output connected to a multi-channel input of the digit amplifier unit, its multi-channel inputs being connected to multi-channel outputs of the clock circuit and of the digit distributor. Inputs of the digital distributor are connected to an output of the clock circuit and to an output of the third stochastic data rounding unit, a multi-channel input of the digit distributor being connected to a multi-channel output of the read-only memory. A sign analyzer has an input and an output connected to an output and an input of the digit distributor and another input connected to an output of the clock circuit. An operand mark unit has a multi-channel output connected to a multi-channel input of the data accumulator and a multi-channel input connected to the clock circuit.

The present invention realized on the basis of stochastic data processing techniques makes it possible to appreciably increase the performance of the computer in studying random processes, in particular, in computing their statistical characteristics, to simplify its electronic circuitry, to reduce hard-ware costs and to reduce the size of special-purpose digital computers. In addition, data compression in the conditions of an ever-increasing flow of information to be processed and stored can be partially solved by using the proposed special-purpose digital computer for statistical data processing. The application of the special-purpose digital computer for statistical data processing contributes materially to technological progress in such spheres of science and engineering as hydrometeorology, geophysics, meterology, medicine, electronics and physics.

BRIEF DESCRIPTION OF THE DRAWINGS

Other objects and advantages of the present invention will become apparent from the following description of a preferred embodiment thereof when read in conjunction with the appended drawings, in which:

FIG. 1 is a block diagram of a special-purpose digital computer for statistical data processing, in accordance with the invention;

DETAILED DESCRIPTION OF THE INVENTION

Figure 4:
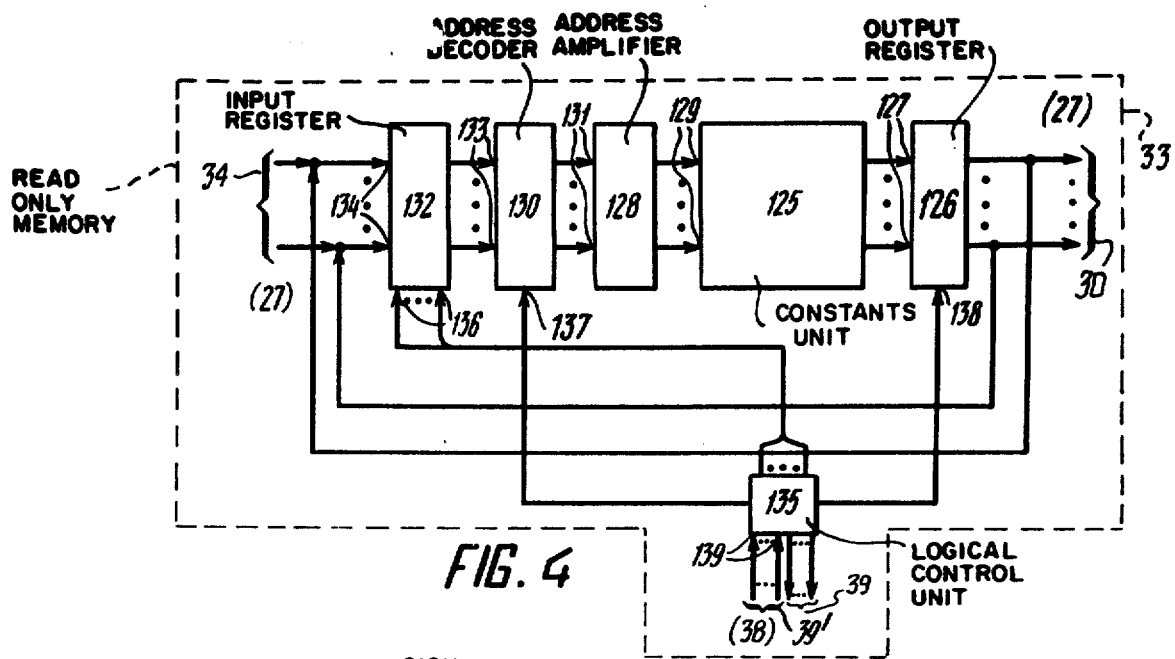
FIG. 4 is a block diagram of a read-only memory, in accordance with the invention.

The special-purpose digital computer for statistical data processing comprises a random-number generator 1 (FIG. 1) and stochastic data rounding units 2, 3, 4 and 5. Multi-channel inputs 6 and 7 of the stochastic data rounding units 2 and 3 are connected to respective input data lines 8 and 9. The computer also comprises a shift register unit 10 and receiving registers 11, 12 and 13. A multi-channel input 14 of the receiving register 3 is inter-connected with a multi-channel input 15 of the first receiving register 11 and connected to a multi-channel output of the shift register unit 10. The multi-channel output of the receiving register 11 is coupled to the multi-channel input 16 of the stochastic data rounding unit 4. The multi-channel output of the shift register 10 is also connected to its own multi-channel input 17. The multi-channel output of the receiving register is coupled to the multi-channel input 17 of the shift register and to the multi-channel input 18 of the stochastic data rounding unit 5. Also connected to the multichannel input 18 of the stochastic data round unit 5 is the multi-channel output of the receiving register 13.

The computer also comprises a single-time step multiplier 19 having inputs 20 and 21 respectively connected to the outputs of the stochastic data rounding units 4 and 5. A senior address digit register 22 and a junior address digit register 23 are provided, an output of the junior address digit register 23 being connected to an input 24 of the senior address digit register 22. A decoder 25 has a multi-channel input 26 connected to multi-channel outputs of the senior address digit register 22 and the junior address digit register 23. A logical memory 27, has a multi-channel input 28 connected to a multi-channel output of the decoder 25, an input 29 connected to an output of the single-time step multiplier 19 and to the outputs of the data rounding units 4 and 5, a multi-channel input 30 is connected to the multi-channel output of logical memory 27, which is coupled to output lines 31, the multi-channel inputs 6 and 7 of the stochastic data rounding units 2 and 3 and the multi-channel input 15 of the receiving register 11, and an output connected to an input 32 of the junior address digit register 23.

The computer comprises a read-only memory 33 having a multi-channel output connected to the multi-channel input 30 of the logical memory 27, and a multi-channel input 34 connected to a multi-channel output of the logical memory 27. A quantization step counter 35 has multi-channel outputs connected to respective multi-channel inputs 36 and 37 of the stochastic data rounding units 2 and 3. A clock 38 has a multi-channel input 39 connected to a multi-channel output of the read-only memory 33. A multi-channel input 39 of the read-only memory 33 is connected to a multi-channel output of the clock 38. A multi-channel input 40 of the clock 38 is connected to a multi-channel output of the random-number generator 1. An output of the clock 38 is connected to inputs 41, 42, 43 and 44 of the stochastic data rounding units 2, 3, 4 and 5, respectively to inputs 45 and 46 of the senior address digit register 22 and of the junior address digit register 23, to an input 47 of the decoder 25, to an input 48 of the random-number generator 1, to inputs 49, 50 and 51 of the receiving registers 11, 12, 13 respectively, to a multi-channel input 52 of the logical memory 27, and to an input 53 of the shift register unit 10.

The computer comprises a distributor 54 having multi-channel inputs 55 and 56 and inputs 57 and 58 connected, respectively, to the multi-channel outputs and the outputs of the stochastic data rounding units 2 and 3. A multi-channel input 59 is connected to the multi-channel output of the clock 38, and a multi-channel input 60 is connected to the multi-channel outputs of the senior address digit register 22 and of the junior address digit register 23. Multi-channel outputs are connected to the multi-channel inputs 36, 37, 60' and 60" of the respective stochastic data rounding units 2, 3, 4 and 5, to multi-channel inputs 61 and 62 of the senior address digit register 22 and of the junior address digit register 23, to the multi-channel input 15 of the first receiving register 11, to a multi-channel input 63 of the receiving register 12. Outputs of the distributor 54 are connected to an input 64 of the quantization step counter 35, and to an input 65 of the logical memory 27.

Figure 2:
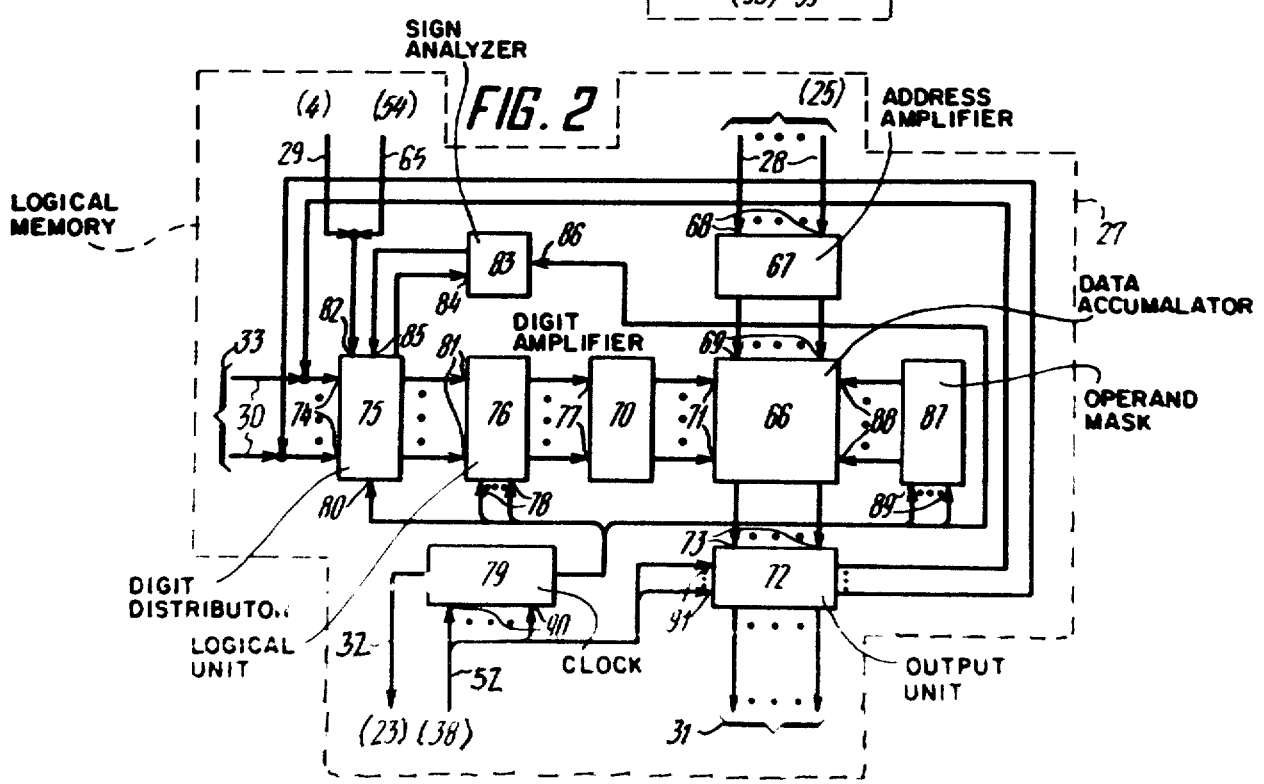
FIG. 2 is a block diagram of a logical memory, in accordance with the invention.

The logical memory 27 comprises a data accumulator 66 (FIG. 2) and an address amplifier unit 67, which has a multi-channel input 68 connected to the multi-channel output of the decoder 25 (FIG. 1). A multi-channel output of the address amplifier unit 67 is connected to a multi-channel input 69 (FIG. 2) of the data accumulator 66. A digit amplifier unit 70 has a multi-channel output connected to a multi-channel 71 of the data accumulator 66. An output unit 72 has multi-channel inputs 91 and 73 respectively connected to the output of the clock 38 and to the multi-channel output of the data accumulator 66. Its multi-channel outputs are respectively connected to the output lines 31, to the multi-channel input 30 (FIG. 1) of the logical memory 27, and to a multi-channel input 74 (FIG. 2) of a digit distributor 75. A logical unit 76 has a multi-channel output connected to a multi-channel input 77 of the digit amplifier unit 70 and a multi-channel input 78 connected to a multi-channel output of a clock circuit 79. Also coupled to said output of said clock circuit 79 is an input 80 of the digit distributor 75. A multi-channel output of the digit distributor 75 is connected to a multi-channel input 81 of the logical unit 76, and an input 82 of the digit distributor 75 is connected to the output of the stochastic data rounding unit 4 and to the output of the distributor 54.

The logical memory 27 (FIG. 2) comprises a sign analyzer 83 having an input 84 and an output connected, respectively, to an output and an input 85 of the digit distributor 75. An input 86 is connected to the output of the clock circuit 79. An operand mark unit 87 has a multi-channel output connected to a multi-channel input 88 of the data accumulator 66 and a multi-channel input 89 connected to output of the clock circuit 79. The output of the clock circuit 79 is also connected to the input 32 of the junior address digit register 23, and a multi-channel input 90 of this circuit 79 and a multi-channel input 91 of the output unit 72 are connected to a respective output of the clock 38.

Figure 3:
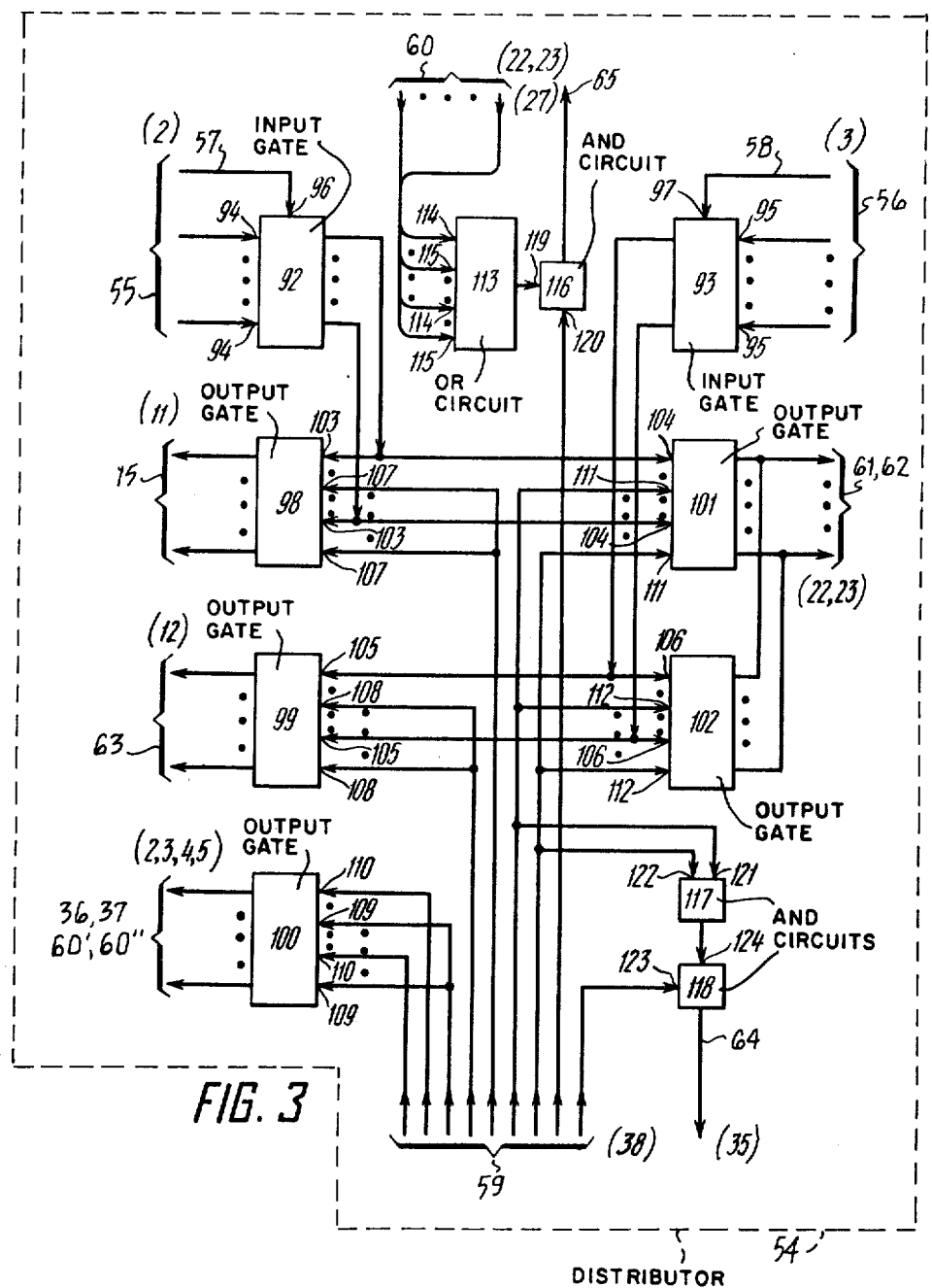
FIG. 3 is a block diagram of a distributor, in accordance with the invention.

The distributor 54 comprises input gate units 92 (FIG. 3) and 93 which have multi-channel inputs 94 and 95 respectively connected to the outputs of the stochastic data rounding units 2 and 3 (FIG. 1). Inputs 96 (FIG. 3) and 97 of the gate units 92 and 93 are respectively connected to the outputs of the stochastic data rounding units 2 and 3 (FIG. 1). Output gate units 98 (FIG. 3), 99, 100, 101 and 102 are provided. Multi-channel outputs of the output gate units 98, 99 and 100 are respectively connected to the multi-channel input 15 of the receiving register 11, to the multi-channel input 63 of the receiving register 12, and to the multi-channel inputs 36, 37, 60' and 60" of the units 2, 3, 4 and 5. Multi-channel outputs of the output gate units 101 and 102 are interconnected and coupled with the multi-channel inputs 61 and 62 of the senior address digit register 22 and of the junior address digit register 23. A multi-channel input 103 of the output gate unit 98 is interconnected with a multi-channel input 104 of the output gate unit 101 and connected to a multi-channel output of the input gate unit 92.

A multi-channel input 105 of the output gate unit 99 is interconnected with a multi-channel input 106 of the output gate unit 102 and connected to a multi-channel output of the input gate unit 93.

Multi-channel inputs 107, 108 and 109 of the output gate units 98 and 99, 100, and a multi-channel input 110 of the unit 100 are connected to the multi-channel output of the clock 38 (FIG. 1). Multi-channel inputs 111 (FIG. 3) and 112 of the output gate units 101 and 102 are interconnected and also connected to the multi-channel output of the clock 38 (FIG. 1).

The distributor 54 comprises an OR circuit unit 113 having multi-channel inputs 114 and 115 connected to the multi-channel outputs of the senior address digit register 22 and of the junior address digit register 23. AND circuits 116, 117 and 118 are also provided. An input 119 of the AND circuit 116 is connected to an output of the OR unit 113, and its output is connected to the input 65 of the logical memory 27. Inputs 120, 121, 122 and 123 of the AND circuits 116, 117 and 118 are connected to the output of the clock 38.

An input 124 of the AND circuit 118 is connected to an output of the AND circuit 117, and an output of the AND circuit 118 is connected to the input 64 of the counter 35.

The read-only memory 33 comprises a constants unit 125 (FIG. 4) and an output register 126, a multi-channel input 127 of which is connected to a multi-channel output of the constants unit 125. A multi-channel output of the output register 126 is connected to the input 30 of the logical memory 27. An address amplifier unit 128 has a multi-channel output connected to a multi-channel input 129 of the constants unit 125. An address decoder 130 has a multi-channel output connected to a multi-channel input 131 of the address amplifier unit 128, and an input register 132 has a multi-channel output connected to a multi-channel input 133 of the address decoder 130. One of the multi-channel inputs 134 of the input register 132 is connected to the output of the logical memory 27 and to the multi-channel output of the output register 126.

The read-only memory 33 also comprises a local control unit 135 having a multi-channel output is connected to a multi-channel input 136 of the input register 132, and outputs connected, respectively, to inputs 137 and 138 of the address decoder 130 and of the output register 126.

A multi-channel input 139 and a multi-channel output of the unit 135 are connected, respectively, to the multi-channel output and the multi-channel input 39 (FIG. 1) of the clock 38.

The operating principle of the proposed special-purpose digital computer for statistical data processing, illustrated in FIG. 1, is as follows.

Assume, for example, that we have hydrometeorological information supplied by ocean water temperature and salinity transmitters and it is required to process this information, i.e. calculate its statistical characteristics, such as:

mathematical expectation $m_x$;
autocorrelation function $R_{xx}(1)$;
spectral power density $S_x(P)$;
unconditional entropy $H(x)$;
conditional entropy $H(x/y)$.

Random processes which describe the temperature of water or its salinity are taken from the transmitters as arrays N of a random pulse sequence of numbers in a binary-decimal code and are entered into the special-purpose digital computer.

Prior to starting operation, all units and circuits of the computer must be set to zero. Depending on the required accuracy of calculating the statistical characteristics, the length of the array N to be processed is specified in the clock 38.

The read-only memory 33 stores the values of the functions $\cos \pi/R$ lp; $-P_i \log_2 P_i$, $\log_2 n/n_o$ "correlation window" functions, microinstructions, and correction factors.

To compute the statistical characteristics of any of the two random processes, a random pulse sequence described by the random functions $Y(t)$ or $X(t)$ and represented, for example, in a binary-decimal r-digit code, is applied through the data lines 8 or 9 to the multi-channel inputs 6 and 7 of the stochastic data rounding unit 2 or 3.

Assume that binary-decimal r-digit codes come from the data lines 9 to the q-digit stochastic data rounding unit 3. At the same time, a sequence of independent uniform pseudo-random numbers is applied from the output of the generator 1 through the clock 38 and the distributor 54 to the multi-channel input 37 of the stochastic data rounding unit 3.

The sequence of r-digit numbers entered into the unit 3 is stochastically rounded off in this unit down to r-q+l digits and sent through the distributor unit 54 and the receiving register 12 to the multi-channel input 17 of the shift register unit 10. Thus, "b" first numbers of the data array N will be written in the unit 10 within "b" operating cycles of the special-purpose digital computer.

When computing the values of mathematical expectation $m_x$ and autocorrelation function $R_{xx}(1)$, the first number in the data array N is written from the multi-channel output of the shift register unit 10 in the receiving register 11.

The information from the multi-channel output of the receiving register 11 is delivered to the multi-channel input 16 of the stochastic data rounding unit 4 whose multi-channel input 60' receives a sequence of independent uniform pseudo-random numbers applied from the output of the generator 1 through the clock 38 and the distributor unit 54. Within the first operating cycle, information from the output of the stochastic data round unit 4 is written in the logical memory 27. Then the information in the shift register unit 10 and in the logical memory 27 is shifted. After that, the second value of the number is applied from the multi-channel output of the shift register unit 10 to the receiving register 13. Further on, the value of the first number is delivered from the receiving register 11 to the multi-channel input 16 of the stochastic data rounding unit 4, and the value of the second number is delivered from the receiving register 13 to the multi-channel input 18 of the stochastic data rounding unit 5. The values of the first and the second numbers arriving at the units 4 and 5, respectively, are rounded off to r bits and sent to the inputs 20 and 21 of the multiplier unit 19 where they are stochastically multiplied and the result is written in the logical memory 27. The computation cycle is repeated depending on a desired accuracy and a specified array of numbers.

Thus, the above operations result in computation of the mathematical expectation $m_x$ and the value $$\frac{1}{N-e} \sum_{i=1}^{N-e} X_i \cdot X_{i+e}$$

of the autocorrelation function $R_{xx}(1)$.

If the mathematical expectation $m_x$ is to be squared, data stored in the logical memory 27 are sent to the multi-channel inputs 6 and 7 of the stochastic data rounding units 2 and 3. From the multi-channel outputs of the units 2 and 3 the data are applied to the inputs 20 and 21 of the single-time step multiplier 19 through the distributor 54, the multi-channel inputs 15 and 63 of the receiving registers 11 and 12, and through the multi-channel inputs 16 and 18 of the stochastic data rounding units 4 and 5. The result taken from the multiplier output of the unit 19 is written in the logical memory 27. The above process is repeated continuously, the number of repetition cycles depending on a required computation accuracy. In order to subtract the squared mathematical expectation $m_x^2$ from the expression $$\frac{1}{N-e} \sum_{i=1}^{N-e} X_i \cdot X_{i+e},$$

information in the form of a binary code proportional to $m_x^2$ is applied from the output of the stochastic data rounding unit 2 through the unit 54, the receiving register 11, the stochastic data rounding unit 4 and the multiplier unit 19 to the input 29 of the logical memory 27. In the memory 27, the binary-coded information is stochastically subtracted from "b" values of the autocorrelation function ordinates which are stored in the logical memory 27. Then the values of $m_x^2$ are written again through the stochastic data rounding unit 2, the distributor unit 54, the first receiving register 11 and the stochastic data rounding unit 4 in the logical memory 27, the processing going on continuously until a required accuracy of computing the autocorrelation function is obtained.

Thus, after the above conversions, the logical memory 27 will hold the values of the autocorrelation function $R_{xx}(1)$. Subsequently, in response to a control signal from the clock 38 applied to the multi-channel input 39' of the read-only memory 33, the value of the "correlation window" function $B_1$ is sent from the multi-channel output of the read-only memory 33 to the multi-channel input 30 of the logical memory 27. The value of the autocorrelation function $R_{xx}(1)$ stored in the logical memory 27 is applied through the stochastic data rounding unit 3, the distributor 54 and the receiving register 12, the shift register unit 10, the receiving register 13 and the stochastic data rounding unit 5 to the input 21 of the single-time step multiplier 19. The value of the function B(1) is applied from the logical memory 27 through the receiving register 11 and the stochastic data rounding unit 4 to another input 20 of the single-time step multiplier 19. In the multiplier 19, the autocorrelation function and the "correlation window" function are multiplied. This process is repeated "b" times on all the values of the autocorrelation function; the computed results are stored in the logical memory 27.

To calculate spectral power density $S_x(p)$, the value cos $\pi/k \cdot 1 \cdot p$ is sent from the read-only memory 33 through the logical memory 27, the receiving register II and the unit 4 to the input 20 of the multiplier 19. The value of the autocorrelation function is applied from the logical memory 27 to the input 21 of the multiplier 19 in the same way as mentioned above. In the multiplier 19, the values of the cosine and the autocorrelation function are multiplied, and the product is written from the output of the multiplier 19 into the logical memory 27. The computation accuracy depends on the number of times the ordinate of the autocorrelation function is multiplied by the value of cosine. The next value of the cosine cos $\pi/k \cdot 1 \cdot p$ is obtained identically and the process is repeated with multiplication by the second ordinate of the autocorrelation function, etc. This occurs "b" times, and the entire cycle of computing the spectral power density $S_x(p)$ whose result is held in the logical memory 27 is performed within 2 $b^2$ operating cycles.

For calculating the value of the unconditional entropy H(x) or H(y) of random processes, the clock 38 disconnects the random-number generator 1 from the stochastic data rounding units 2, 3, 4 and 5 and applies control signals, of which one comes to the input 64 of the quantization step counter 35. When computing the value of unconditional entropy H(x), H(y), the probabilities of any i-th state of realizing $x_i$ of a random process are estimated as the frequencies with which the values of these measurements fall into respective amplitude intervals in the sample array N.

A random pulse sequence described by the random functions X(t) or Y(t) is applied, respectively, to the multi-channel input 6 or 7 of the stochastic data rounding unit 2 or 3, the other multi-channel input 36 or 37 of the stochastic data rounding units 2 or 3 receiving signals from the multi-channel outputs of the quantization step counter 35. The stochastic data rounding unit 2 or 3 and the quantization step counter 35 are used to determine the number of the amplitude interval of the realization of $x_i$ whose value is represented in a binary code. These values of the amplitude interval of the realization of $x_i$ are delivered from the multi-channel output of the stochastic data rounding unit 2 or 3 through the distributor unit 54 to the input 65 of the logical memory 27 and are written with the aid of the senior address digit register 22, the junior address digit register 23 and the decoder 25 into the logical memory 27 which accumulates and counts the number of realizations of $x_i$ which fall into a corresponding amplitude interval. When sampling the information array N of the size $N=2^k$, where k equal to $1, 2, \ldots, w$ is an integer exponent of a binary notation base, the division operation $n_i/N$ to estimate probabilities $p_i$ of the measurements of a random pulse sequence falling into an amplitude interval is replaced by a transfer of a binary point in the value of each realization of $x_i$, which amounts to a shift of data in the logical memory 27. These signals are sent from the multi-channel output of the logical memory 27 to the multi-channel input 34 of the read-only memory 33. The information proportional to the value $P_i \log_2 . P_i$ is applied to the multi-channel input 30 of the logical memory 27 as the first operand. Then, in response to a control signal from the clock 38, the values of the correction factor $a_n$ are delivered from the multi-channel output of the read-only memory 33. These values of $a_n$ go through the multi-channel input 30 of the logical memory 27 as the second operand. In the logical memory 27, the values of $P_i \log_2 P_i$ are added to the correction factor $a_n$, and the result of the addition operation which gives unconditional entropy $H(x)$ is delivered through the multi-channel output of the memory 27 to the output lines 31 and further to the peripheral devices.

When computing conditional entropy $H(x/y)$, the distributor unit 54 and the clock 38 disconnect the pseudo-random number generator 1 from the stochastic data rounding units 2, 3, 4 and 5 and start the quantization step counter 35 which determines the number of gradations contained in the pair of measurements of the random sequence $x_k \Lambda x_{k+1}$, $x_{k+1} \Lambda x_{k+2}$, etc. Then, the distributor unit 54 sets, in accordance with the number of a certain gradation, the address codes at the senior address digit register 22 and at the junior address digit register 23, respectively. The senior address digit register 22 corresponds to the number of the zone which is found in the first measurement from the sum of the two measurements and is a function of the number of gradations i contained in a particular measurement. The junior address digit register 23 corresponds to the number of the location in the logical memory 27 within the zone defined from the second measurement and equal to the number of gradations j contained in the second measurement. Then, the address code is decoded in the decoder unit 25 and delivered to the multi-channel 28 of the logical memory 27. The number of these measurements $K_{ji}$ or $K_i$ in the corresponding location of the logical memory 27 is counted by a logical memory counter which increases the contents of this location by 1. The values of $K_{ji}$ and $K_i$ serve as arguments of the functions $\eta = -P \log_2 P$ whose values are held in the read-only memory 33. Further calculation of conditional entropy amounts to addition in the logical memory 27 of the values of the functions $\eta$ read out of the read-only memory 33 at the addresses determined by the contents of the corresponding locations of the logical memory 27 with respective correction factors $a_n$ whose values are also stored in the read-only memory 33.

In this way real-time calculation of the above statistical characteristics, in particular, finding the unconditional entropy $H(x)$ and the conditional entropy $H(x/y)$ by means of the proposed special-purpose digital computer, makes it possible to fully process the above hydrometeorological information represented by random processes. The knowledge of statistical characteristics, such as of conditional and unconditional entropy, permits more reliable short-term and long-term hydrometeorological forecasts.

The logical memory 27 (FIG. 2) operates as follows.

Information comes through the multi-channel input lines 30 and multi-channel input 74 to the digit distributor 75, which comprises a counter and a register (not shown), through the logical unit 76, via the multi-channel input 77, to digit amplifier unit 70 and, via the multi-channel input 71, to the data accumulator 66.

Processing of information depends on the formation of a "d" digit work of modulo 2 sums Z and of the Q transfer word shifted one digit to the left. After the first word of the modulo 2 sum and the transfer work are obtained, the transfer word is analyzed. If $Q \neq 0$, the addition cycle is repeated, the digit-by-digit modulo 2 addition operation being performed between the modulo 2 sum word and the transfer word which is shifted one digit towards the higher-order digits. At $Q = 0$ the addition process is terminated. The interchange and transfer of information are carried out through the distributor 75, the logical unit 76, the data accumulator 66, and the output unit 72. Shifting, inverting and modulo 2 summation are performed in the logical unit 76 over the operands stored in the data accumulator 66. The address is sent through the multi-channel input 28 (FIG. 1) of the logical memory 27 to the multi-channel input 68 (FIG. 2) of the address amplifier unit 67, then goes from the multi-channel output of the unit 67 to the data accumulator 66, and a required memory location is selected by means of the operand mask unit 87 controlled by the clock circuit 79. The number of measurements of the random sequence $K_{ji}$ and $K_i$ is counted by the counter of the digit distributor 75, and the results are written in the memory location of the data accumulator 66. Information is read out of the data accumulator 66 with the aid of the address amplifier unit 67, information from the multi-channel output of the data accumulator 66 being delivered through one multi-channel output of the output unit 72 to the output lines 31 (FIG. 1) of the logical memory 27, and through another multi-channel output to the multi-channel input 74 (FIG. 2) of the digit distributor 75 for its regeneration. The operating principle of the distributor unit 54 (FIG. 3) is as follows.

When writing stochastically rounded numbers in the receiving register unit 12 or 11 (FIG. I), the signals are delivered from the stochastic data rounding unit 3 or 2 through the multi-channel input 56 or 55 of the distributor unit 54, respectively, to the multi-channel input 95 (FIG. 3) or 94 of the input gate unit 93 or 92 of the distributor unit 54, from the multi-channel outputs of which they go, respectively, to the multi-channel inputs 106 and 104 of the output gate unit 102 and of the output gate unit 98 or to the multi-channel inputs 105 and 104 of the output gate unit 99 and of the output gate unit 101. When control signals are applied from the clock 38 (FIG. 1) through the multi-channel input 59 of the distributor unit 54 to the respective multi-channel inputs 107 (FIG. 3), 108, 111 or 112, signals from the respective multi-channel outputs of the output gate units 98, 99, 101 or 102, respectively go, depending on the operating mode, to the receiving registers 11 (FIG. 12) and 12, to the senior address digit register 22 and to the junior address digit register 23. The uniform number sequence delivered from the clock 38 through the multi-channel input 59 and the multi-channel inputs 109 (FIG. 3) and 110 of the output gate unit 100 is applied (or not applied), depending on the control signals, from its multi-channel output to the stochastic data rounding units 2,3,4 and 5 (FIG. 1) for calculating unconditional entropy H(x) or conditional entropy H(x/y). When computing unconditional entropy H(x) and conditional entropy H(x/y), control signals are delivered through the multi-channel input 59 of the distributor unit 54 to the inputs 121 (FIG. 3) and 122 of the AND circuit 117, and the input 123 of the AND circuit 118, another input 124 of which receives a signal from the output of the AND circuit 117. Then, the signal from the output of the AND circuit 118 is applied to the input 64 (FIG. 1) of the quantization step counter 35. As the address code arrives at the multi-channel input 60 of the distributor unit 54, the address code goes to the multi-channel inputs 114 and 115 of the OR circuit unit 113 and then, from the output of the OR circuit, to the input 119 of the AND circuit 116, another input 120 of the AND circuit receiving a control signal from the multi-channel input 59 of the distributor unit 54. The output signal of the AND circuit 116 is applied to the input 65 (FIG. 1) of the logical memory 27.

The read-only memory 33 (FIG. 4) operates as follows.

The address code goes through the multi-channel input 34 (FIG. 1) of the read-only memory 33 through the input register 132 (FIG. 4) and, via the multi-channel input 133, to the address decoder 130 where it is decoded. Then it is sent from the decoder output through the address amplifier unit 128 and, via the multi-channel input 129, to the constants unit 125. From the multi-channel output of the constants unit 125, the selected number code is applied through the output register 126 and the logical memory 27 to the output lines 31 (FIG. 1) and also goes, in response to a signal from the local control unit 135 (FIG. 4), to the multi-channel input 134 of the input register 132 and the cycle is repeated for the next address. In this way an unconditional transfer is accomplished to the next address of the read-only memory 33 (FIG. 1). In response to the signals from the local control unit 135 (FIG. 4), the addresses can also be selected in a cyclic manner, an increase of an address by 1 being accomplished by an input register containing an address register and an address counter.

The proposed special-purpose digital computer permits calculation of the statistical characteristics of random processes, for example, conditional entropy, thus expanding the functional capabilities of the computer, reducing the hardware costs and broadening the range of its application.

What is claimed is:

1. A special-purpose digital computer for statistical data processing, comprising:
   input data lines;
   output lines;
   a random-number generator, for producing a uniform pseudo-random number sequence, having an input and a multi-channel output;
   first and second stochastic data rounding units, for linear conversion of the code into its probability and for stochastic rounding of numbers, each having a first multi-channel input connected to respective input data lines, a second multi-channel input, an input, a multi-channel output, and an output;
   third and fourth stochastic data rounding units, for linear conversion of the code into its probability and for stochastic rounding of numbers, each having first and second multi-channel inputs, an input and an output;
   a shift register unit having a multi-channel input, an input, and a multi-channel output connected to said multi-channel input of said shift register unit;
   a first receiving register having a multi-channel input connected to said multi-channel output of said shift register, an input, and a multi-channel output connected to said first multi-channel input of said third stochastic data rounding unit;
   a second receiving register having a multi-channel input, an input, and a multi-channel output connected to said multi-channel input of said shift register unit and to said first multi-channel input of said fourth stochastic data rounding unit;
   a third receiving register having a multi-channel input connected to said multi-channel output of said shift register unit, an input, and a multi-channel output connected to said first multi-channel input of said first stochastic data rounding unit;
   a single-time step multiplier, for stochastic multiplication of numbers, having a first input connected to said output of said third stochastic data rounding unit, a second input connected to said output of said fourth stochastic data rounding unit, and an output;
   a senior address digit register having a multi-channel input, first and second inputs, and a multi-channel output;
   a junior address digit register having a multi-channel input, first and second inputs, a multi-channel output, and an output connected to said first input of said senior address digit register;
   a decoder having a multi-channel input connected to said multi-channel outputs of said senior address digit register and of said junior address digit register, an input, and a multi-channel output;
   a logical memory, for accumulating and storing data, adding numbers and summing unity increments of numbers, having a first multi-channel input connected to said multi-channel output of said decoder, a second multi-channel input, a third multi-channel input, a first input connected to said outputs of said third and fourth stochastic data rounding units and to said output of said multiplier, and a second input, an output connected to said first input of said junior address digit register, and a multi-channel output connected to said first multi-channel inputs of said logical memory and of said first and second stochastic data rounding units, to said multi-channel input of said first receiving register, and to said output lines;
   a read only memory, for storing harmonic functions, "correlation window" functions, logarithmic functions, correlation factors and microinstructions, having a first multi-channel input connected to said multi-channel output of said logical memory, a second multi-channel input, a first multi-channel output connected to said second multi-channel input of said logical memory, and a second multi-channel output;
   a quantization step counter, for determining the value of a quantization amplitude interval, having first and second multi-channel outputs respectively connected to said second multi-channel inputs of said first and second stochastic data rounding unit, and an input;
   a clock having a first multi-channel input connected to said second multi-channel output of said read only memory, a second multi-channel input connected to said multi-channel output of said random number generator, a first multi-channel output connected to said second multi-channel input of said read only memory, a second multi-channel output, and an output connected to said inputs of said random number generator, said first, second, third and fourth stochastic data rounding units, said shift register unit, said first, second and third receiving registers, and said decoder and to said second inputs of said senior address digit register, and said junior address digit register, and connected to said third multi-channel input of said logical memory; and a distributor, for distributing information depending on the operating modes of the special-purpose digital computer, having first and second multi-channel inputs respectively connected to said multi-channel outputs of said first and second stochastic data rounding units, a second multi-channel input connected to said second multi-channel output of said clock, a third multi-channel input connected to said multi-channel outputs of said senior address digit register and said junior address digit register, first and second inputs respectively connected to said outputs of said first and second stochastic data rounding units, a first multi-channel output connected to said second multi-channel inputs of said first, second, third and fourth stochastic data rounding units, a second multi-channel output connected to said multi-channel inputs of said senior address digit register and said junior address digit register, third and fourth multi-channel outputs respectively connected to said multi-channel inputs of said first and second receiving registers, a first output connected to said input of said quantization step counter, and a second output conneced to said second input of said logical memory.

2. A special-purpose digital computer as set forth in claim 1, wherein the logical memory comprises:

a data accumulator having first, second and third multi-channel inputs and a multi-channel output;

an address amplifier unit having a multi-channel input connected to said first multi-channel input of said logical memory, and a multi-channel output connected to said first multi-channel input of said data accumulator;

a digit amplifier unit having a multi-channel input and a multi-channel output connected to said second multi-channel input of said data accumulator;

an output unit having a first multi-channel input connected to said multi-channel output of said data accumulator, a second multi-channel input connected to said third multi-channel input of said logical memory, a first multi-channel output connected to said multi-channel output of said logical memory, and a second multi-channel output;

a clock circuit having a multi-channel input connected to said third multi-channel input of logical memory, a first output connected to said output of said logical memory, and a second output;

a digit distributor, for receiving and intermediate storage of information and for summing unity increments, having a multi-channel input connected to said second multi-channel input of said logical memory, a first input connected to said first and second inputs of said logical memory, a second input connected to said second output of said clock circuit, a third input, an output, and a multi-channel output;

a logical unit for adding numbers having a multi-channel output connected to said multi-channel input of said digit amplifier unit, a first multi-channel input connected to said multi-channel output of said digit distributor, and a second multi-channel input connected to said second output of said clock circuit;

a sign analyzer having a first input and an output respectively connected to said output and said third input of said digit distributor, and a second input connected to said second output of said clock circuit; and an operand masking unit having a multi-channel output connected to said multi-channel input of said data accumulator, and a multi-channel input connected to said output of said clock circuit.

3. A special-purpose digital computer according to claim 1, wherein said distributor comprises:

first and second input gates having multi-channel inputs respectively connected to said first and second multi-channel inputs of said distributor, inputs respectively connected to said first and second inputs of said distributor, and multi-channel outputs;

first and fourth output gates having first multi-channel inputs connected to said multi-channel output of said first input gate, second multi-channel input connected to respective inputs of said third multi-channel input of said distributor, and multi-channel outputs respectively connected to said third and second multi-channel outputs of said distributor;

second and fifth output gates having first multi-channel inputs connected to said multi-channel output of said second input gate, second multi-channel inputs connected to respective inputs of said third multi-channel inputs of said distributor, and multi-channel outputs respectively connected to said fourth and second multi-channel outputs of said distributor;

a third output gate having multi-channel inputs connected to respective inputs of said third multi-channel input of said distributor, and a multi-channel output connected to said first multi-channel input of said distributor;

an OR circuit having multi-channel inputs connected to respective inputs of said fourth multi-channel input of said distributor, and an output;

a first AND circuit having a first input connected to said output of said OR circuit, a second input connected to a respective input of said third multi-channel input of said distributor, and an output connected to said second output of said distributor;

a second AND circuit having inputs connected to respective inputs of said third multi-channel input of said distributor, and an output; and a third AND circuit having a first input connected to a respective input of said third multi-channel input of said distributor, a second input connected to said output of said second AND circuit, and an output connected to said first output of said distributor.

4. A special-purpose digital computer according to claim 1, wherein said read only memory includes:

a local control unit having a multi-channel input connected to said second multi-channel input of said read only memory, a first multi-channel output connected to said second multi-channel output of said read only memory, a second multi-channel output, and first and second outputs;

an input register having a first multi-channel input connected to said first multi-channel input of said read only memory, a second multi-channel input connected to said second multi-channel output of said local control unit, and a multi-channel output;

an address decoder having a multi-channel input connected to said multi-channel output of said input register, an input connected to said first output of said local control unit, and a multi-channel output;

an address amplifier having a multi-channel input connected to said multi-channel output of said address decoder, and a multi-channel output;

a constants unit having a multi-channel input connected to said multi-channel output of said address amplifier, and a multi-channel output; and an output register having a multi-channel input connected to said multi-channel output of said local control unit, and a multi-channel output connected to said first output of said read only memory and to said multi-channel input of said input register.

* * * * *